United States Patent [19]

Benton et al.

[11] Patent Number: 5,164,944

[45] Date of Patent: Nov. 17, 1992

[54] METHOD AND APPARATUS FOR EFFECTING MULTIPLE ERROR CORRECTION IN A COMPUTER MEMORY

[75] Inventors: Michael K. Benton, Malvern; John L. Janssen, Paoli; Andrew T. Jennings, West Chester, all of Pa.

[73] Assignee: Unisys Corporation, Plymouth Meeting, Pa.

[21] Appl. No.: 535,757

[22] Filed: Jun. 8, 1990

[51] Int. Cl.⁵ .............................................. G06F 12/00
[52] U.S. Cl. ...................................... 371/40.1; 371/2.2
[58] Field of Search .................... 371/40.1, 40.2, 38.1, 371/39.1, 2.1, 2.2

[56] References Cited

U.S. PATENT DOCUMENTS

| | | | |
|---|---|---|---|
| 3,784,976 | 1/1974 | Ho | 340/146.1 |
| 4,205,324 | 5/1980 | Patel | 371/50 |
| 4,506,364 | 3/1985 | Aichelmann | 371/2.2 |
| 4,667,326 | 5/1987 | Young | 371/39.1 |
| 4,679,196 | 7/1987 | Tsujimoto | 371/51 |
| 4,745,604 | 5/1988 | Patel et al. | 371/38 |
| 4,747,080 | 5/1988 | Yamada | 365/200 |
| 4,764,927 | 8/1988 | Izumita et al. | 371/39 |
| 4,775,978 | 10/1988 | Hartness | 371/40.1 |
| 4,817,091 | 3/1989 | Katzman et al. | 371/9 |
| 4,819,154 | 4/1989 | Stiffler et al. | 364/200 |
| 4,862,463 | 8/1989 | Chen | 371/40.1 |
| 4,951,284 | 8/1990 | Abdel-Ghaffar | 371/38.1 |
| 4,993,028 | 2/1991 | Hillis | 371/40.1 X |

FOREIGN PATENT DOCUMENTS 080354 6/1983 European Pat. Off. .
084460 7/1983 European Pat. Off. .
278415 8/1988 European Pat. Off. .

OTHER PUBLICATIONS

"Byte-Oriented Error-Correcting Codes for Semi-Conductor Memory System," Chem. The XIV International Conference on Fault-Tolerant Computing, Kissimmee, USA, Jun. 20-22, pp. 84-87.

Primary Examiner—Robert W. Beausoliel
Attorney, Agent, or Firm—Ratner & Prestia

[57] ABSTRACT

A memory system provides a method for error detection and correction. Large data words are divided into multiple error correction zones. One zone from each of two or more words are combined to form an error domain. Address bits are also included in the domains. Check bits are generated from the data bits in each domain and stored with the data. During data retrieval, each domain is processed separately, generating a syndrome for each domain. The syndromes provide indication of bit errors, allowing the correction of a single-bit error in each domain. Multiple-bit errors may thus be corrected within each word using a single-bit error correction code. Data are distributed in physical memory so that, within each domain, no more than one data bit is stored in the same memory device. This method provides full error correction capability in the presence of a catastrophic memory package failure, so long as failures in multiple packages do not cause multiple errors within a single error correction domain. During both read and write operations, error correction code processing may be performed in parallel for multiple domains, enhancing performance.

11 Claims, 11 Drawing Sheets

FIG. 7a

ECC COVERAGE: DATA

| BIT | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 |   |   |   | X |   |   |   | X |   |   | X |   | X | X |   |   |   | X |
| 1 |   |   | X |   |   |   | X |   |   |   |   |   |   |   | X |   | X |   |
| 2 |   | X |   |   |   | X |   |   | X | X |   |   | X |   |   | X |   |   |
| 3 | X |   |   |   | X | X |   |   | X |   |   | X |   |   | X | X |   | X |
| 4 |   |   | X | X | X |   |   |   |   | X | X | X |   | X | X |   | X | X |
| 5 | X | X |   |   |   |   |   | X | X | X |   |   |   |   |   |   |   |   |
| 6 | X | X |   |   |   |   |   |   |   |   |   |   |   |   |   |   |   |   |

| 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|
|   |   | X |   |   | X |   | X | X |   | X |   | X | X | X |   |   | X |
|   | X |   | X | X |   |   |   |   |   |   | X |   | X | X | X |   | X |
| X | X |   | X |   | X |   | X |   | X |   | X | X |   | X |   | X | X |
|   |   |   |   | X | X | X | X |   | X | X | X | X | X |   |   |   |   |
| X |   | X |   | X |   | X |   | X | X |   | X |   | X |   |   | X | X |
|   | X |   | X |   |   |   | X | X |   |   |   |   |   |   | X | X | X |
|   |   |   |   |   |   |   |   |   |   |   |   |   |   |   |   |   |   |

ADDRESS

| 36 | 37 | 38 | 39 | 40 | 41 | 42 | 43 |
|---|---|---|---|---|---|---|---|
| X |   | X |   | X | X | X | X |
|   | X | X | X | X | X | X | X |
| X | X |   | X | X |   | X |   |
|   |   |   |   |   | X |   |   |
| X | X |   | X |   | X | X | X |
| X | X | X | X | X | X |   | X |
| X | X | X |   |   | X |   | X |

CHECK BITS

| C0 | C1 | C2 | C3 | C4 | C5 | C6 |
|---|---|---|---|---|---|---|
| X |   |   |   |   |   |   |
|   | X |   |   |   |   |   |
|   |   | X |   |   |   |   |
|   |   |   | X |   |   |   |
|   |   |   |   | X |   |   |
|   |   |   |   |   | X |   |
|   |   |   |   |   |   | X |

FIG.7b

ECC COVERAGE: CACHE STATUS

| | CACHE STATUS DATA | | | | | | ADDRESS | | | | | | | |
|---|---|---|---|---|---|---|---|---|---|---|---|---|---|---|
| BIT | 0 | 1 | 2 | 3 | 4 | 5 | 6 | 7 | 8 | 9 | 10 | 11 | 12 | 13 |
| P0 |   |   | X |   |   | X |   | X | X |   |    | X  | X  | X  |
| P1 |   | X |   |   | X |   |   | X |   | X | X  |    | X  | X  |
| P2 | X |   |   | X |   |   |   | X | X |   | X  | X  |    | X  |
| P3 | X |   |   |   | X |   |   | X | X |   | X  | X  | X  |    |
| P4 | X | X | X | X |   |   |   |   | X | X | X  |    |    |    |
| P5 | X | X | X | X | X | X | X |   |   |   |    |    |    |    |

CHECK BITS

| C0 | C1 | C2 | C3 | C4 | C5 |
|---|---|---|---|---|---|
| X |   |   |   |   |   |
|   | X |   |   |   |   |
|   |   | X |   |   |   |
|   |   |   | X |   |   |
|   |   |   |   | X |   |
|   |   |   |   |   | X |

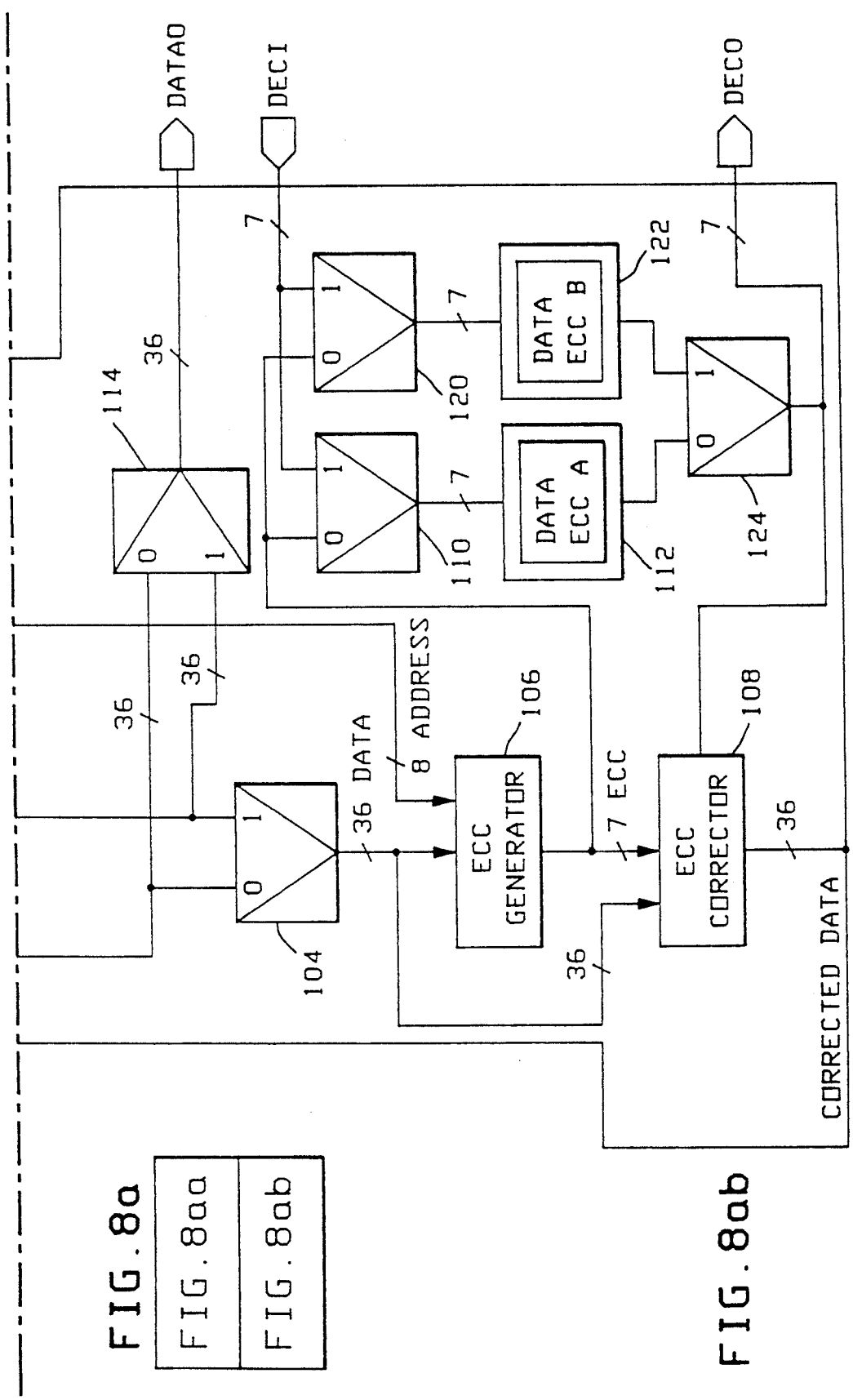

METHOD AND APPARATUS FOR EFFECTING MULTIPLE ERROR CORRECTION IN A COMPUTER MEMORY

BACKGROUND OF THE INVENTION

1. Field of the Invention

This invention relates generally to Error Correcting Code (ECC) techniques and particularly to an ECC method in which data words are divided into multiple domains for ECC purposes.

2. Description of the Prior Art

The use of error correction and detection techniques when transmitting or storing binary data is of vital importance to ensure data integrity in digital data processing systems. In any digital system, noise in the channel between transmitter and receiver can introduce errors, such that individual bits may be inverted and an improper message received. Linear block codes have been devised to detect and correct errors to improve data integrity. Using these codes, the transmitted message consists of information bits, and some number of parity bits, or check bits. The check bits are calculated and generated at the transmitter. Check bits are transmitted with the actual information bits and are decoded by the receiver.

Syndrome bits are generated at the receiver by decoding the received information and check bits. Using the syndrome bits it is possible to determine whether one or more errors have occurred and, for some codes, the bit positions in the binary word at which the errors occurred. The number of errors which may be detected and/or corrected depends upon the code used.

Hamming codes have been determined to be the most efficient in terms of the least number of parity bits for a given number of information bits, and they are commonly used in data processing systems. Using a Hamming code with Hamming distance of 3 (i.e., each word in the code, data bits and check bits, is different from any other word in at least 3 different bit positions) single bit errors can be corrected and double bit errors can be detected. If it is necessary to implement more than single bit error correction, then the Hamming distance of the code must be increased. The error correction capability of a code is given by the following formula:

Error Correction Capability $= [(Dmin - 1)/2]$.

where Dmin is the minimum Hamming distance. The brackets [] denote the integer part of $(Dmin - 1)/2$. From this equation, it can be seen that a minimum Hamming distance of 4 also will correct single-bit errors and detect double bit errors.

Data processing and computer systems typically use a modified Hamming code of distance four for error correction and detection. To increase the Hamming distance of a code, and thereby increase the error correction capability, it is necessary to increase the number of check bits.

An error correction scheme employed in U.S. Pat. No. 4,817,091 to Katzman, et al., is a typical example of an error correction code. In this exemplary system, a 16-bit data field is protected by a 6-bit check field. The encoding scheme used is a modified Hamming code of distance four, wherein each data bit is protected by three check bits. That is, an error in a data bit causes three of the six check bits to change state. When the syndrome is computed, comparing the old check bits against the new check bits, the syndrome will have an odd parity. This indicates that a single bit error has occurred, and the bit position of the error location may be found easily by consulting the error code generation table. The check bits apply across the 16-bit word, and both data bits and check bits are located on the same physical memory array.

It is possible to perform a second level of ECC in a data processing system. U.S. Pat. No. 4,745,604 to Patel, et al., teaches a two-level ECC that is used for data stored on a disk drive. Data is divided into subblocks and each subblock is assigned a first level ECC. In addition, a second-level ECC is defined for the entire block, including the subblocks and the first-level ECC bits. This method requires extra time for computation of the second-level ECC, since each level is computed sequentially.

When designing a fault-tolerant memory system, it is desirable to consider the effects of word size, error correction capability, random access memory (RAM) failure modes and the Mean Time Between Failures (MTBF). An analysis of MTBFs for different word sizes shows an inverse relationship between word size and MTBF. Larger word sizes result in the storage or transmission of a greater number of bits, increasing the probability that an error will occur in at least one bit-position of the word. If the number of errors which are to be corrected is increased from one to two, more check bits are needed for the same number of information bits. This increase in the volume of data stored (or transferred) may actually decrease the MTBF.

Field studies of the failure modes of dynamic random access memories (DRAMS) show that failures of full integrated circuits (ICs) have a substantial influence on MTBF. Single bit failures occur more frequently than full IC failures, but the failure of an isolated bit is easily corrected by a single-bit error correcting code. The failure of a full IC typically results in a greater number of incorrect bits than ECC methods can correct. Because of the number of bits in a DRAM, the failure of an entire IC accounts for many system failures.

U.S. Pat. No. 4,747,080 to Yamada relates to a semiconductor memory having a self-correction function. The memory array has redundant data cells. Both horizontal and vertical error checking are performed. The individual memory cells are arranged in groups such that no two cells in a group have the same horizontal or the same vertical parity bit. When both the horizontal and vertical parity checks have been performed, an erroneous cell can be located at the intersection of the horizontal and vertical parity check values. When an erroneous cell is located, it is replaced by one of the spare cells. Although a system employing self-correcting memory arrays is protected against single bit failure, the failure of the entire IC cannot be easily corrected in this system.

SUMMARY OF THE INVENTION

In the prior art, error correction schemes employed in memory storage systems do not provide protection for large data words without a large number of check bits. Storage of these additional check bits has an adverse affect on mean time between failure of the memory system, due to the extra hardware required. Thus, an increase in data accuracy is typically accompanied by a decrease in the reliability of the system. In the present invention, data words are divided into zones, each zone having its own error correcting code. By dividing words into smaller zones and performing error correction on multiple zones simultaneously, plural errors within a single word may be corrected. Simultaneous error correction on each zone allows system recovery in substantially less time relative to single zone error processing.

Another advantageous feature of the present invention is the allocation of data in physical memory. This embodiment of the present invention uses a Dual In-Line Memory Module, or DIMM, for data and ECC storage. A DIMM consists of six Dynamic RAM (DRAM) integrated circuits, configured as a single package. Each of the DRAM integrated circuits can store 1 bit by 1 Megabit. For any given data word, no more than one bit per ECC zone is stored in a DIMM. Therefore, if a DIMM fails catastrophically, the six Megabits of data it contains are each protected by a separate ECC zone. Thus, the system can recover (i. e., correct each single-bit error) even if an entire DIMM fails.

BRIEF DESCRIPTION OF THE DRAWINGS

FIG. 7a is an annotated table showing the encoding scheme used to generate syndrome bits from data bits and address bits.

FIG. 7b is an annotated table showing the encoding scheme used to generate syndrome bits from the cache status and address bits.

DETAILED DESCRIPTION OF THE PREFERRED EMBODIMENT

The following is a description of an exemplary ECC scheme in accordance with the present invention.

Overview

Figure 1A:
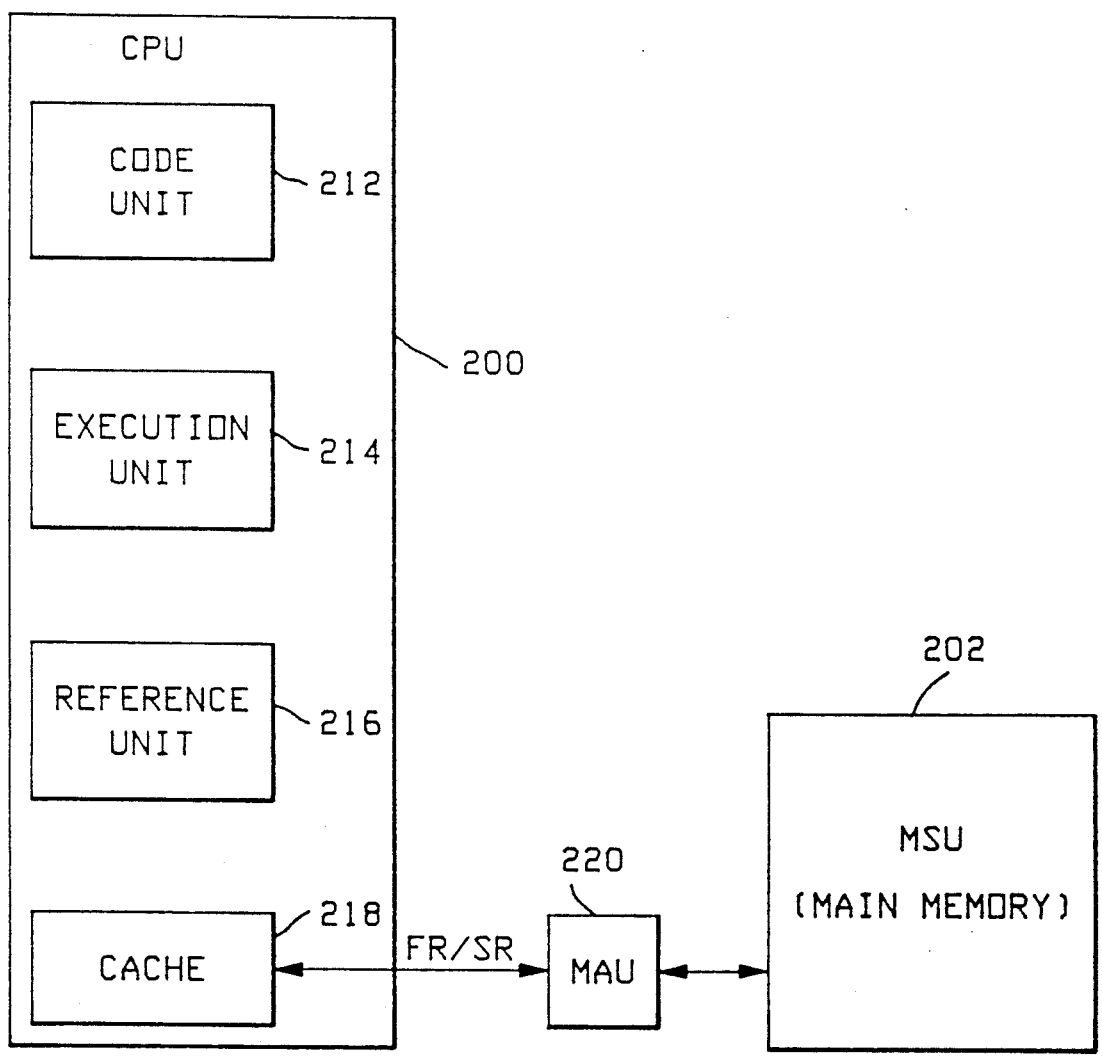
FIG. 1a is a block diagram of a parallel pipelined computer system in which multiple Central Processing Units (CPU's) or processors may be coupled to a main memory. Only one CPU 110 is shown in this FIGURE.

FIG. 1a is a block diagram of a parallel-pipelined computer system in which multiple CPU's 200 are coupled to a main memory 202, referred to as a Memory Storage Unit (MSU).

Only one CPU 200 is shown in FIG. 1a. The CPU 200 includes a Code Unit 212, an Execution Unit 214, a Reference Unit 216, and a Cache Memory 218. The code unit retrieves instructions from the MSU 202 and partially decodes them. Any memory references in the code processed by the code unit are handled by the reference unit 216. The data cache memory 218 is coupled to the MSU 202 via a Memory Access Unit (MAU) 220.

When an address reference from an instruction cannot be found in the cache memory 218, the cache memory conditions the MAU 220 to make an access request to the main memory 202.

The cache 218 may simultaneously request both a fetch and a store operation from the MAU 220. The MAU 220 analyzes the requests and prioritizes them to minimize interference among concurrent memory operations.

The exemplary cache memory 218 is a purgeless cache. Data values are stored in the cache memory 218 in four-word sets. The status of any four-word set in the cache is held with the original data in the MSU 202. Thus, if one of the multiple CPUs, say Processor A, fetches a four-word set from memory and intends to modify the data in the set, the cache status entry for the data in the main memory 202 will indicate that the data in the set is held by Processor A exclusively. Any attempt by, for example, Processor B to access that same data in main memory 202 will be unsuccessful until the modified data has been written back into the main memory by Processor A.

Alternatively, Processor A may request data from main memory which will not be modified. In this case, the cache status entry for the four-word set will indicate that Processor A has the data in a shared state. Processor B may also access shared data but may not gain exclusive (i.e. write) access to the data until the set has been invalidated in Processor A's cache. Thus, the cache status information plays a vital role in regulating multiple processor access to a shared main memory.

In this embodiment of the invention, a cache status entry corresponding to each four-word data set is stored in main memory 202 with the data set itself. Each four-word data set is protected by several error correcting code domains, and each corresponding cache status entry is independently protected by its own ECC domain. Memory accesses to each four-word data set are simultaneously accompanied by an access to the corresponding cache status entry. Control circuitry in the MSU 202, which is responsive to the cache status, determines if the memory access request is permissible.

Detailed Description

Figure 1B:
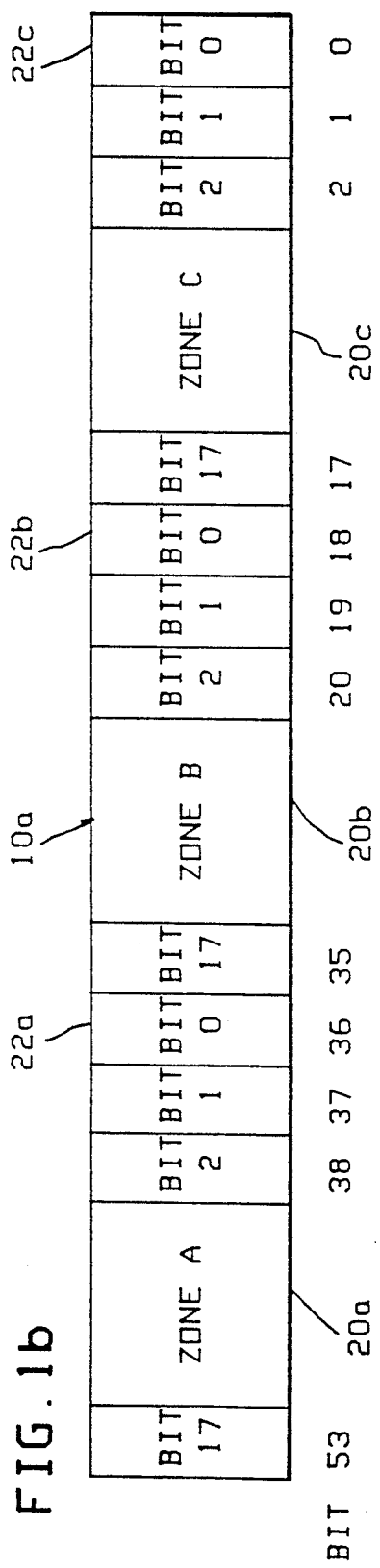
FIG. 1b is a diagram representing a single data word, broken into multiple zones.
Figure 2:
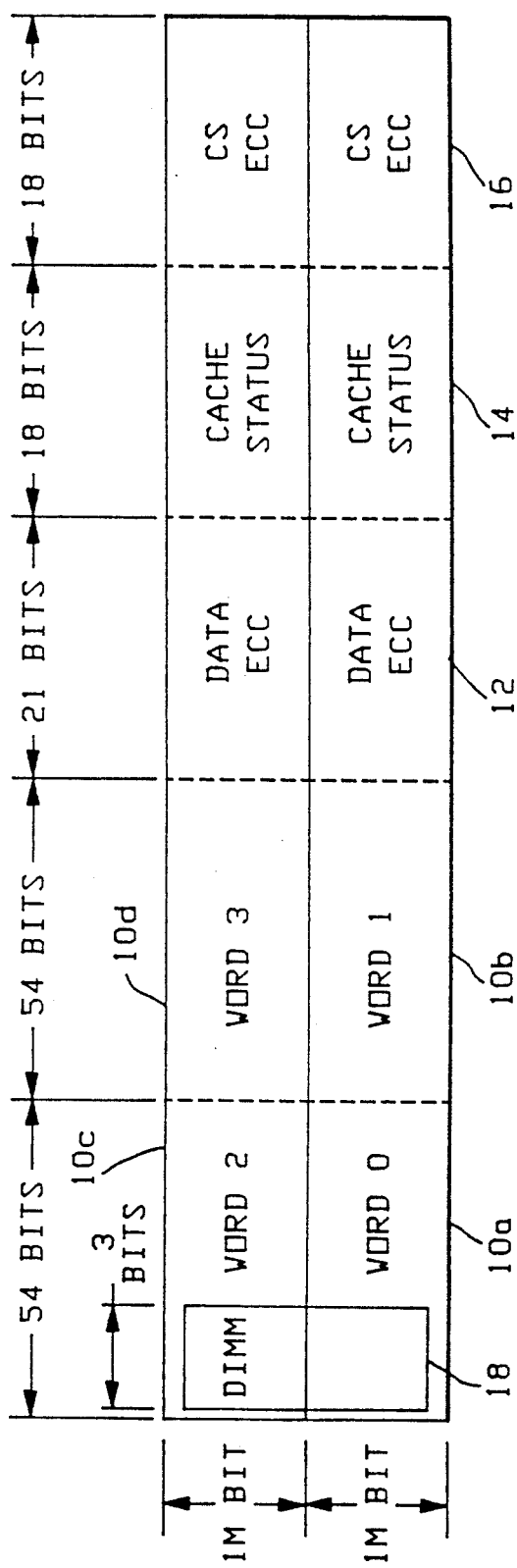
FIG. 2 is a block diagram which shows the organization of data words as shown in FIG. 1b across memory.

FIG. 1b shows how a single data word 10a in main memory 202 may be divided into multiple error correction zones 20a–c. The 54-bit word 10a is broken down into three 18-bit segments, or zones, 20a–c, for purposes of ECC. The bits in each zone are numbered BIT0 through BIT17. Referring to FIG. 2, during memory operations, two data words 10a and 10b are processed simultaneously for ECC generation. Likewise, words 10c and 10d are processed simultaneously. Within each word 10a, the three zones 20a–c are also processed simultaneously. FIG. 2 shows an advantageous organization of data and ECC. The data words 10a–d each comprise 54 bits. The next field is Data ECC 12. This field contains 21 bits, or 7 bits for each of the three error domains covered. The ECC field 12 contains the correction codes which ensure the integrity of data words 10a–d. The next field is Cache Status 14, which is 18 bits wide, followed by the Cache Status ECC field 16, which is 18 bits wide.

FIG. 2 also shows the relationship between the data organization and physical memory. One DRAM address applied to a Dual In-Line Memory Module (DIMM) 18 addresses the six DRAMS as three bits, 22a 22b and 22c, of data, for each of two groups of two words. In FIG. 2, the first group includes words 10a and 10b and the second group includes words 10c and 10d. Each of the six bits accessed by a single DRAM address on the DIMM is stored on a separate DRAM integrated circuit 1 bit wide by 1 Megabit deep. Data, Cache Status and ECC together occupy 55 DIMMs in this embodiment.

In the exemplary configuration, each bit addressed by a single DRAM address belongs to a different ECC zone 20a-c. By spreading the data so that no two bits from a single ECC zone are stored in the same DIMM 18, the data is protected against data loss or corruption due to the failure of a DIMM or the failure of an individual DRAM integrated circuit of the DIMM.

The error correcting code used in the present invention is a modified Hamming code of distance four, such that, within an error domain, single-bit errors are corrected, and double-bit errors detected.

A 7-bit ECC 12 is generated for each of the following data and address combinations (error domains):

(WORD0A refers here to WORD0, Zone A. Similarly, WORD0B refers to WORD0, Zone B. WORD0C refers to WORD0, Zone C. Similar nomenclature applies to the other zones discussed below.)

WORD0A(BIT0-B17) WORD1A(BIT0-B17) Address (8 bits);
WORD0B(BIT0-B17) WORD1B(BIT0-B17) Address (8 bits);
WORD0C(BIT0-B17) WORD1C(BIT0-B17) Address (8 bits).

Two more words, WORD2 and WORD3 are likewise protected by a 7-bit ECC for each of these domains:

WORD2A(BIT0-B17) WORD3A(BIT0-B17) Address(8 bits);
WORD2B(BIT0-B17) WORD3B(BIT0-B17) Address (8 bits);
WORD2C(BIT0-B17) WORD3C(BIT0-B17) Address (8 bits).

By dividing each word into 3 zones, combining one zone from each of two or more different words into a domain and generating an ECC for each domain, it is possible to correct multiple bit errors in a single word using a single bit error correction scheme for each zone, so long as there is not more than one error per domain.

Figure 3:
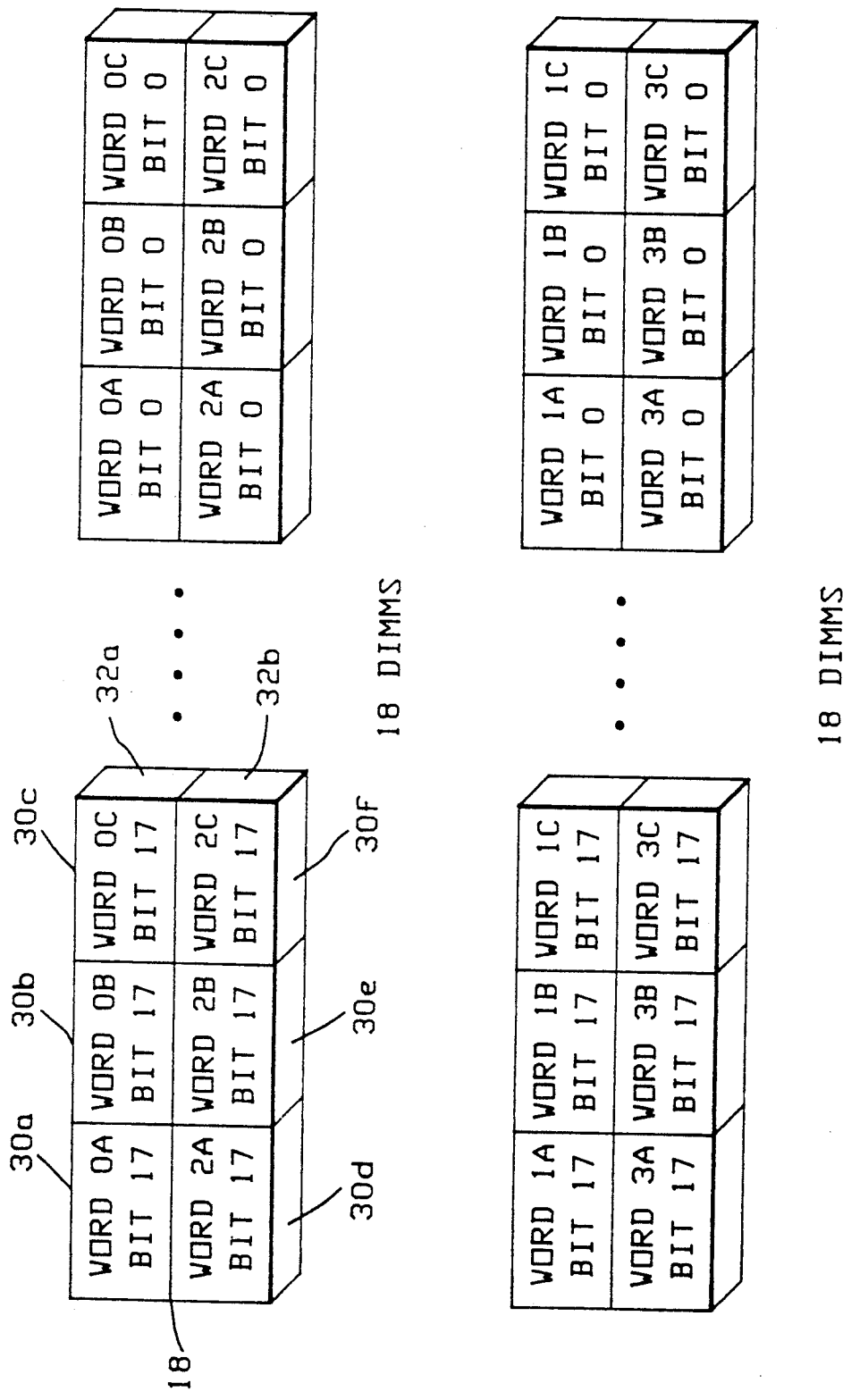
FIG. 3 is a block diagram which shows the mapping of data words stored onto multiple DIMMs.

FIG. 3 is a block diagram which illustrates how four data words are divided among 36 DIMMs. The data words are physically located on DRAM modules referred to as Dual In-line Memory Modules (DIMMs) 18. Each DIMM consists of 6 DRAM memories 30a-f, each one cell wide by one Megabit deep. The cells are organized into 2 banks 32a, 32b of 3 cells each. Data words WORD0 (10a) through WORD3 (10c) are stored in the DIMMs 18 such that each DIMM contains only 3 bits (with a depth of 1 Megabit) of two different words, each bit belonging to a different error domain.

When the error correction code is processed for a particular domain, the ECC generator draws data from 36 different DIMMs. Thus, even if an entire DIMM fails, each single-bit error may be corrected. The effect of a DIMM failure may be understood by reference to FIG. 3. If one of the DIMMs 18 fails catastrophically, a bit is missing in each of six distinct error domains. In this example, referring to FIG. 1b, WORD2 BIT0 22c, BIT18 22b, and BIT36 22a and WORD0 BIT0 22c, BIT18 22b, and BIT36 22a would be missing. These bit positions within the data word are as shown in FIG. 1b. The single bit error correction capability of the present invention allows correction of the missing bits, so long as there are no other bit errors in WORD0 10a or WORD2 10c in the other DIMMs.

FIG. 3 shows the allocation of data words among DIMMs. In this embodiment of the invention, a data word size of 54 bits requires nine of the DIMMs 18 for storage. The 36 DIMMs 18 shown are used to hold four 54 bit data words.

Figure 4:
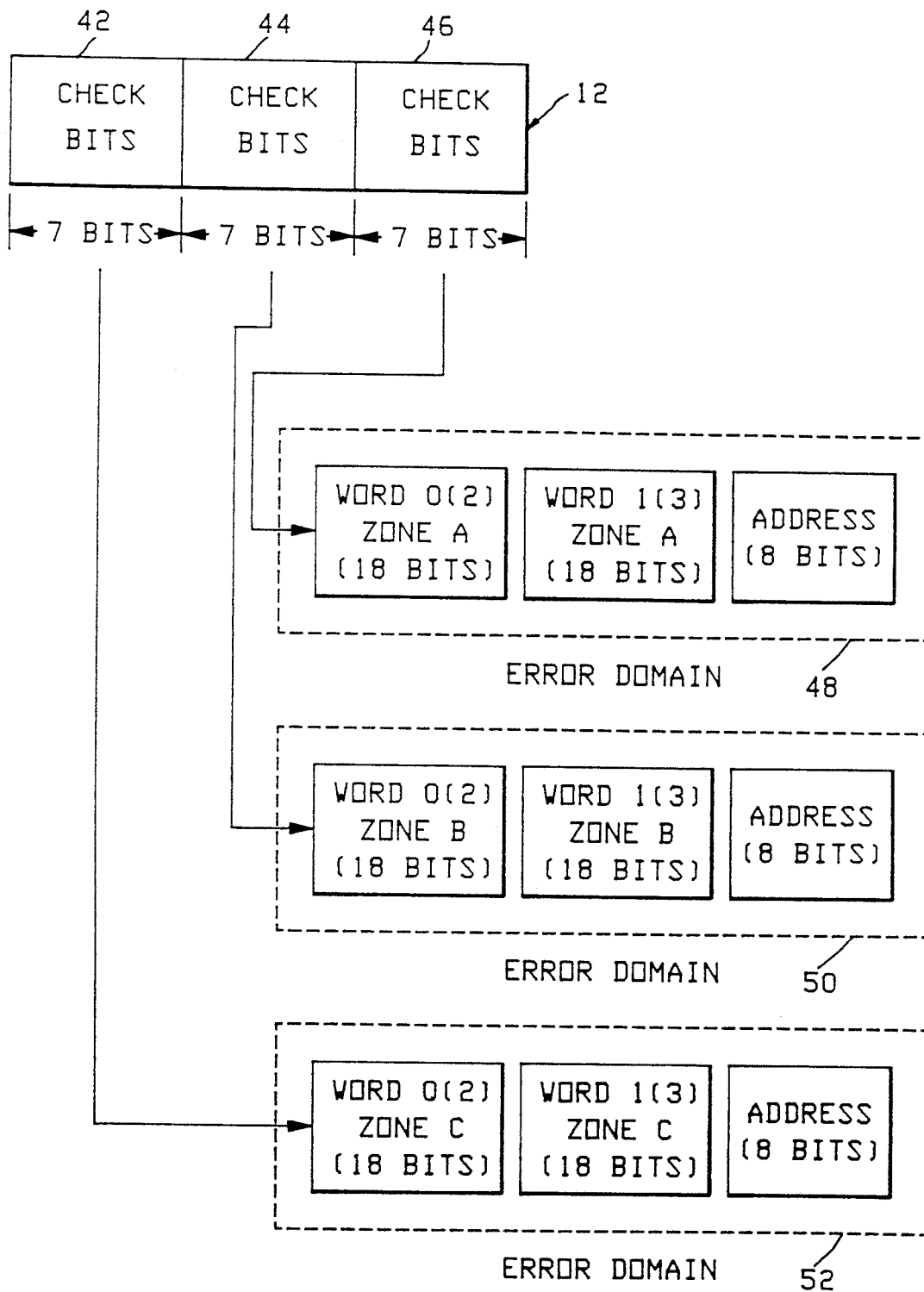
FIG. 4 is a data structure diagram which relates groups of ECC bits to their corresponding data zones and address fields.

FIG. 4 shows how the check bits 42, 44, 46 are applied to each of the error domains. In this embodiment, eight address bits are included with the protected data word zones. The seven check bits 42 protect domain 52, the next seven check bits 44 protect domain 50, and the next seven check bits 46 protect domain 48. In this FIGURE only WORD0 10a and WORD1 10b are represented. Similarly, check bits are provided for data and address bits for WORD2 10c and WORD3 10d. Thus, in the exemplary embodiment, one zone each from two different words are combined into a single error domain. However, other embodiments in the same spirit may use one zone from a single word, or combine zones from a number of words to form an error domain.

Address bits are included in the error domains, and address errors are detected and reported to the CPU upon fetches from main memory. As a part of maintaining cache status, every CPU fetch or store consists of a read-modify write cycle of the DRAMs within the MSU. During a read-modify-write cycle, an ECC check is made on address before committing to the write operation. An address error, as indicated by the syndrome, indicates that the data obtained during the read part of the cycle is from a main memory address different from what was intended.

Figure 5:
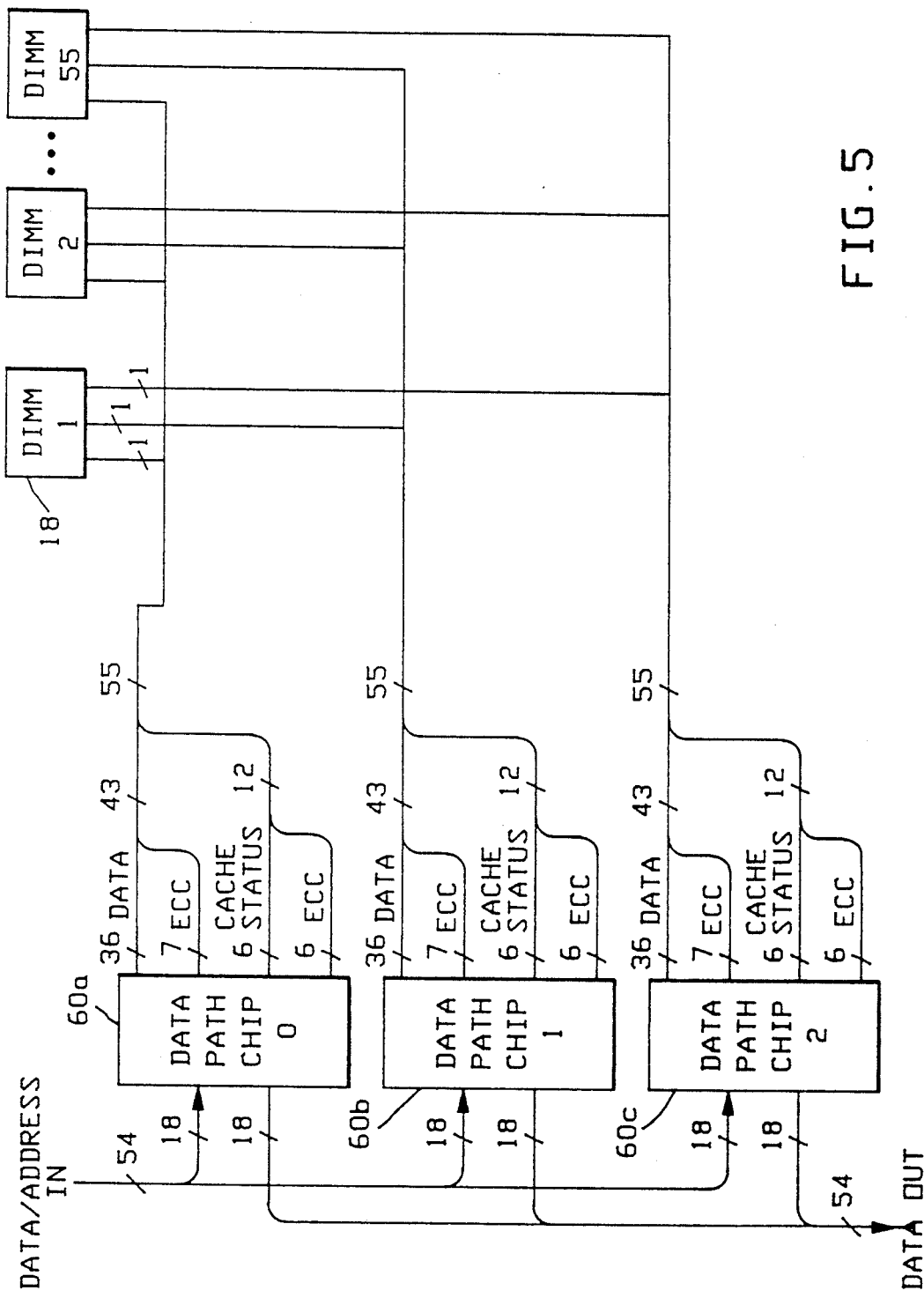
FIG. 5 is a block diagram showing data path IC interconnection to physical memory (DIMMs).

FIG. 5 is a block diagram showing the interconnection of three data path ICs 60a-c, operating in parallel, with 55 DIMMs. The circuitry shown in FIG. 5 is included in the MSU 202 of FIG. 1a. In this embodiment of the invention, error correction codes are generated by data path ICs 60a-c for data stored into the DIMMs 18. The ICs 60a-c also perform error detection and correction of data retrieved from the DIMMs 18. The data path IC 60a-c is a multi-function IC which stores data words, generates ECC upon write operations, detects and corrects errors during read operations, and routes data to the appropriate DIMM. The 55 DIMMs 18 hold the data, Cache Status and ECC data which are used by this exemplary embodiment of the invention.

The three data path chips 60a-c are each capable of supporting data, cache status, and ECC transfers between the CPU and DIMMs. During a CPU store operation, after the receipt of a four word set from the CPU, two successive DIMM writes are performed by the three data path chips. On the first write, data path IC 60a writes WORD 0 zone A and WORD 1 zone A into the DIMMs, while data path IC 60b writes WORD 0 zone B and WORD 1 zone B, and data path IC 60c writes WORD 0 zone C and WORD 1 zone C. Thus, the first write operation accomplishes the storage of WORD 0 and WORD 1 into the DIMMS. On the next write, data path IC 60a writes WORD 2 zone A and WORD 3 zone A, data path IC 60b writes WORD 2 zone B and WORD 3 zone B, and data path IC 60c writes WORD 2 zone C and WORD 3 zone C into the DIMMs.

After the receipt of store data from the CPU and before writing to the DIMMs, the ECC processing logic contained in the data path chips 60a–c computes check bits based on the two data word zones and twenty four address bits. Each data path chip computes ECC based on the two data segments it receives, and eight of the total twenty four address bits. Address bits are thus segmented into three zones, similar to the data zones. The address is thus protected by ECC, and although address failures are not corrected, they are reported if they occur. The resulting 21 check bits are output along with the 108 data bits to the appropriate DIMMs. Check bits for cache status are computed separately from check bits for data. Each data path IC 60a–c handles one-third of the eighteen-bit cache status word and each IC computes check bits based on its portion of cache status. This segmentation of the cache status word into zones for purposes of ECC confers similar advantages as that of segmenting the data word, i. e., multiple bit errors may be detected by processing each zone simultaneously.

Figure 6:
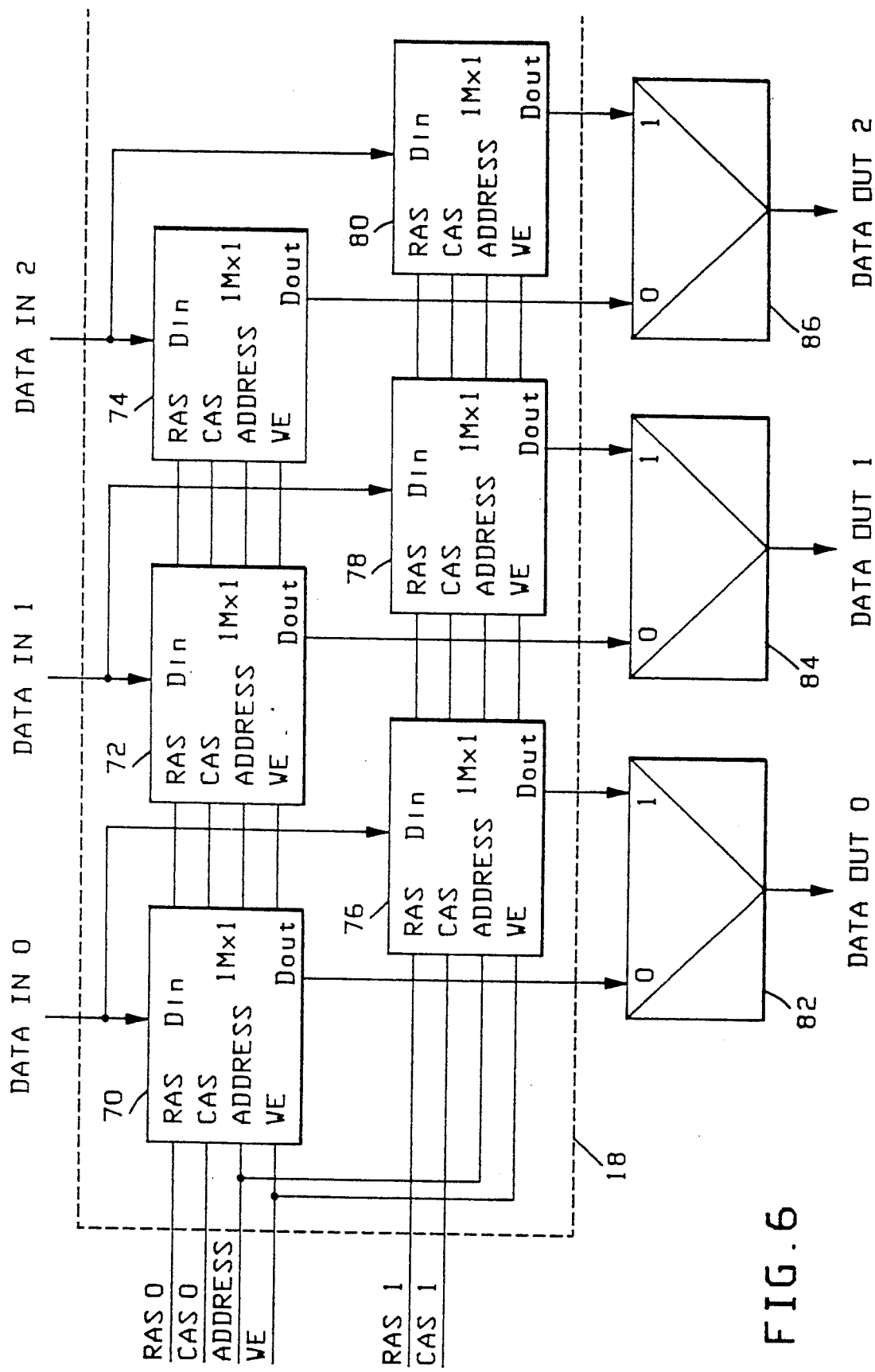
FIG. 6 is a block diagram which illustrates the logical organization of a single DIMM.

FIG. 6 is a block diagram which illustrates the structure of a representative DIMM 18. The DIMM 18 consists of 6 DRAM memories; 70, 72, 74, 76, 78 and 80; each 1 bit by 1 Megabit, organized into two banks of 3 bits each. DRAMs 70, 72, and 74 constitute the first bank, while DRAMs 76, 78, and 80 constitute the second bank. Each bank of the DIMM 18 is provided with separate Row Address Strobe (RAS) and Column Address Strobe (CAS), common Write Enable (WE) and address lines. The signal DATAIN0 is applied to the data input lines of the DRAMs 70 and 76 while the signal DATAIN1 is applied to the data input lines of the DRAMs 72 and 78 and the signal DATAIN2 is applied to the data input lines of the DRAMs 74 and 80. The presence of independent address strobes allows independent control in writing each bank.

In this embodiment of the invention, the data output lines of the DRAMs are not interconnected. Instead, the data output lines of each pair of DRAMs 70, 76; 72, 78 and 74, 80 are provided to respective input terminals of three two-input multiplexers, 82, 84 and 86. Address Bit 1 (second lowest address bit) selects between Bank 1 (DIMMs 70, 72, and 74) and Bank 2 (DIMMs 76, 78, 80). The signals DATAOUT0, DATAOUT1, and DATAOUT2 are supplied to the data path chips 60a–c on separate input lines.

Each data path IC 60a–c includes registers (not shown in FIG. 5) which store each word as it is provided by the DIMMs 18, and circuitry (also not shown in FIG. 5) which generates the syndrome bits from the check bits and data words. Within each zone, single bit data errors, single bit cache errors, and check bit errors are corrected. Within each zone, address errors, multiple data errors, and multiple cache errors are reported to the processor. The internal structure of the ICs 60a–c are described below in reference to FIGS. 8a and 8b.

FIGS. 7a and 7b are tables showing how data and address bits are protected by check bits. In this embodiment of the invention, a modified Hamming code of distance four is used. A modified Hamming code of distance four is desirable to achieve single error correction and double error detection. The number, K, of check bits used to protect an information vector having M bits of data, such that the resulting code has a Hamming distance of four may be found from the following inequality:

$$2^{K-1} >= M + K$$

In order to provide error correction coverage for the domain shown in FIG. 7a, comprising 36 bits of data, 18 bits each from WORD 0 and WORD 1 (or WORD 2 and WORD 3) plus 8 address bits, 7 check bits are required. Since the number of information bits M in this embodiment is 44 (18+18+8), K is equal to 7.

Check bits are generated by the modulo-2 addition (exclusive-OR) of each bit marked with an "X" in each row. The encoding scheme in this exemplary embodiment of the invention is designed such that every information bit in the domain is used to compute three or five check bits. Thus, if a single information bit is corrupted, either three or five check bits are inverted. The resulting syndrome will have odd parity.

Another advantageous aspect of the code used is that the parity tree widths, that is to say, the number of information bits used to compute each check bit, are nearly equal. In this embodiment of the invention, each of check Bits C0, C1, C2, and C4 has a parity tree width of 21, while C3 has a parity tree width of 22, and C5 and C6 each have a parity tree width of 23. Choosing the code such that parity tree widths are similar optimizes the speed of the encoders, and minimizes the relative propagation delays.

The check-bit generator used in the present invention may be a network of exclusive-or (XOR) gates such as is shown in U.S. Pat. No. 4,817,091 to Katzman, et al., which is hereby incorporated by reference. The check-bit generator shown in the Katzman patent differs from that used in the present invention in that only odd parity trees are used in the present invention. The Katzman patent also describes the principles of syndrome generation. Using these principles, one skilled in the art can readily build a syndrome generator for use with the present invention.

The following example demonstrates how the particular code used in this embodiment of the invention generates check bits. For purposes of this example, assume the following combination of data and address bits are to be protected by ECC:

00 0000 0000 0000 0011 00 0000 0000 0000 0001 1010 1000

This bit pattern (or information vector) represents an exemplary WORD 0 Zone A, (18 bits) followed by WORD 1 Zone A (18 bits), followed by 8 address bits. The values used in the example are as follows:

WORD 0 Zone A = 00003 Hexadecimal

WORD 1 Zone A = 00001 Hexadecimal

Address = A8 Hexadecimal

The check bits are obtained by overlaying the information vector over the ECC coverage table, and exclusive-ORing the information bits which exist at each bit position marked X, to produce each check bit. In this example, the given information vector yields the following equations for the check bits:

C0 = 0

C1 = 0

C2 = 1

C3 = 1 + 1 = 0

$C4 = 1 + 1 = 0$ $C5 = 1 + 1 + 1 + 1 + 1 = 1$ $C6 = 1 + 1 + 1 + 1 = 0$ where "+" represents the exclusive-OR function.

The complete check bit word then is 0100100. This value is stored in the DIMMs 18 along with the data words.

A 7 bit syndrome word is generated by the ECC circuitry of the data path IC and is used to identify single bit errors. The syndrome is defined as the exclusive-OR sum of the old check bit word and the new check bit word. That is, each bit $C_n$ of the old check word read from the DIMMs (18) is exclusive-OR'd with the corresponding bit $C_n$ generated from data read from the DIMMs. The resulting syndrome word indicates whether there are errors in data, address, check bits, and, if there is only one error, its location. Table 1 shows each possible value of the syndrome word for both data and cache status, and the errors represented by each possible syndrome.

TABLE 1

| SYNDROME | DATA ERRORS | | | | | CS ERRORS | | | | |
|---|---|---|---|---|---|---|---|---|---|---|
| | SBE | MBE | AE | CBE | BIT | SBE | MBE | AE | CBE | BIT |
| 00 | . | . | . | . | 0 | . | . | . | . | 0[1] |
| 01 | 1 | . | . | 1 | 0 | 1 | . | . | 1 | 0 |
| 02 | 1 | . | . | 1 | 1 | 1 | . | . | 1[2] | 1[2] |
| 03 | . | 1 | . | . | 0 | . | 1 | . | . | 0 |
| 04 | 1 | . | . | 1 | 2 | 1 | . | . | 1 | 2 |
| 36 | . | 1 | . | . | 0 | . | 1 | . | . | 0 |
| 37 | 1 | 1 | . | . | 0 | 1 | 1 | . | . | 0 |
| 38 | 1 | . | . | . | 14 | 1 | . | . | . | 0 |
| 39 | . | 1 | . | . | 0 | . | 1 | . | . | 0 |
| 3A | . | 1 | . | . | 0 | . | 1 | . | . | 0 |
| 3B | 1 | 1 | . | . | 0 | 1 | 1 | . | . | 0 |
| 3C | . | 1 | . | . | 0 | . | 1 | . | . | 0 |
| 3D | 1 | 1 | . | . | 0 | 1 | 1 | . | . | 0 |
| 3E | 1 | 1 | . | . | 0 | 1 | 1 | . | . | 0 |
| 3F | . | 1 | . | . | 0 | . | 1 | . | . | 0 |
| 40 | 1 | . | . | 1 | 6 | | | | | |
| 41 | . | 1 | . | . | 0 | | | | | |
| 42 | . | 1 | . | . | 0 | | | | | |
| 43 | 1 | . | . | . | 13 | | | | | |
| 44 | . | 1 | . | . | 0 | | | | | |
| 45 | 1 | . | . | . | 12 | | | | | |
| 46 | 1 | . | . | . | 11 | | | | | |
| 47 | . | 1 | . | . | 0 | | | | | |
| 48 | . | 1 | . | . | 0 | | | | | |
| 49 | 1 | . | . | . | 10 | | | | | |
| 4A | 1 | . | . | . | 9 | | | | | |
| 4B | . | 1 | . | . | 0 | | | | | |
| 4C | 1 | . | . | . | 8 | | | | | |
| 4D | . | 1 | . | . | 0 | | | | | |
| 4E | . | 1 | . | . | 0 | | | | | |
| 4F | 1 | 1 | . | . | 0 | | | | | |
| 50 | . | 1 | . | . | 0 | | | | | |
| 51 | 1 | . | . | . | 7 | | | | | |
| 52 | 1 | . | . | . | 6 | | | | | |
| 53 | . | 1 | . | . | 0 | | | | | |
| 54 | 1 | . | . | . | 5 | | | | | |
| 55 | . | 1 | . | . | 0 | | | | | |
| 56 | . | 1 | . | . | 0 | | | | | |
| 57 | 1 | 1 | . | . | 0 | | | | | |
| 58 | 1 | . | . | . | 4 | | | | | |
| 59 | . | 1 | . | . | 0 | | | | | |
| 5A | . | 1 | . | . | 0 | | | | | |
| 5B | 1 | 1 | . | . | 0 | | | | | |
| 5C | . | 1 | . | . | 0 | | | | | |
| 5D | 1 | 1 | . | . | 0 | | | | | |
| 5E | 1 | 1 | . | . | 0 | | | | | |
| 5F | . | 1 | . | . | 0 | | | | | |
| 60 | . | 1 | . | . | 0 | | | | | |
| 61 | 1 | . | . | . | 3 | | | | | |
| 62 | 1 | . | . | . | 2 | | | | | |
| 63 | . | 1 | . | . | 0 | | | | | |
| 64 | 1 | . | . | . | 1 | | | | | |
| 65 | . | 1 | . | . | 0 | | | | | |
| 66 | . | 1 | . | . | 0 | | | | | |
| 05 | . | 1 | . | . | 0 | . | 1[3] | . | . | 0 |
| 06 | . | 1 | . | . | 0 | . | 1 | . | . | 0 |
| 07 | 1 | . | . | . | 33 | 1 | . | 1[4] | . | 7 |
| 08 | 1 | . | . | 1 | 3 | 1 | . | . | 1 | 3 |
| 09 | . | 1 | . | . | 0 | . | 1 | . | . | 0 |
| 0A | . | 1 | . | . | 0 | . | 1 | . | . | 0 |
| 0B | 1 | . | . | . | 32 | 1 | . | . | 1 | 6 |
| 0C | . | 1 | . | . | 0 | . | 1 | . | . | 0 |
| 0D | 1 | . | . | . | 31 | 1 | . | . | 1 | 5 |
| 0E | 1 | . | . | . | 30 | 1 | . | . | 1 | 4 |
| 0F | . | 1 | . | . | 0 | . | 1 | . | . | 0 |

TABLE 1-continued

| SYNDROME | DATA ERRORS | | | | | CS ERRORS | | | | |
|---|---|---|---|---|---|---|---|---|---|---|
| | SBE | MBE | AE | CBE | BIT | SBE | MBE | AE | CBE | BIT |
| 10 | 1 | . | . | 1 | 4 | 1 | . | . | 1 | 4 |
| 11 | . | 1 | . | . | 0 | . | 1 | . | . | 0 |
| 12 | . | 1 | . | . | 0 | . | 1 | . | . | 0 |
| 13 | 1 | . | . | . | 29 | 1 | 1[5] | . | . | 0 |
| 14 | . | 1 | . | . | 0 | . | 1 | . | . | 0 |
| 15 | 1 | . | . | . | 28 | 1 | 1 | . | . | 0 |
| 16 | 1 | . | . | . | 27 | 1 | 1 | . | . | 0 |
| 17 | . | 1 | . | . | 0 | . | 1 | . | . | 0 |
| 18 | . | 1 | . | . | 0 | . | 1 | . | . | 0 |
| 19 | 1 | . | . | . | 26 | 1 | 1 | . | . | 0 |
| 1A | 1 | . | . | . | 25 | 1 | 1 | . | . | 0 |
| 1B | . | 1 | . | . | 0 | . | 1 | . | . | 0 |
| 1C | 1 | . | . | . | 24 | 1 | 1 | . | . | 0 |
| 1D | . | 1 | . | . | 0 | . | 1 | . | . | 0 |
| 1E | . | 1 | . | . | 0 | . | 1 | . | . | 0 |
| 1F | 1 | . | 1 | . | 7 | 1 | 1 | . | . | 0 |
| 20 | 1 | . | . | 1 | 5 | 1 | . | . | 1 | 5 |
| 21 | . | 1 | . | . | 0 | . | 1 | . | . | 0 |
| 22 | . | 1 | . | . | 0 | . | 1 | . | . | 0 |
| 23 | 1 | . | . | . | 23 | 1 | . | 1 | . | 3 |
| 24 | . | 1 | . | . | 0 | . | 1 | . | . | 0 |
| 25 | 1 | . | . | . | 22 | 1 | . | 1 | . | 2 |
| 26 | 1 | . | . | . | 21 | 1 | . | 1 | . | 1 |
| 27 | . | 1 | . | . | 0 | . | 1 | . | . | 0 |
| 28 | . | 1 | . | . | 0 | . | 1 | . | . | 0 |
| 29 | 1 | . | . | . | 20 | 1 | . | 1 | . | 0 |
| 2A | 1 | . | . | . | 19 | 1[6] | . | . | . | 5[6] |
| 2B | . | 1 | . | . | 0 | . | 1 | . | . | 0 |
| 2C | 1 | . | . | . | 18 | 1 | . | . | . | 4 |
| 2D | . | 1 | . | . | 0 | . | 1 | . | . | 0 |
| 2E | . | 1 | . | . | 0 | . | 1 | . | . | 0 |
| 2F | 1 | 1 | . | . | 0 | 1 | 1 | . | . | 0 |
| 30 | . | 1 | . | . | 0 | . | 1 | . | . | 0 |
| 31 | 1 | . | . | . | 17 | 1 | . | . | . | 3 |
| 32 | 1 | . | . | . | 16 | 1 | . | . | . | 2 |
| 33 | . | 1 | . | . | 0 | . | 1 | . | . | 0 |
| 34 | 1 | . | . | . | 15 | 1 | . | . | . | 1 |
| 35 | . | 1 | . | . | 0 | . | 1 | . | . | 0 |
| 67 | 1 | 1 | . | . | 0 | | | | | |
| 68 | 1 | . | . | . | 0 | | | | | |
| 69 | . | 1 | . | . | 0 | | | | | |
| 6A | . | 1 | . | . | 0 | | | | | |
| 6B | 1 | . | 1 | . | 6 | | | | | |
| 6C | . | 1 | . | . | 0 | | | | | |
| 6D | 1 | . | 1 | . | 5 | | | | | |
| 6E | 1 | . | 1 | . | 4 | | | | | |
| 6F | . | 1 | . | . | 0 | | | | | |
| 70 | 1 | 1 | . | . | 0 | | | | | |
| 71 | . | 1 | . | . | 0 | | | | | |
| 72 | . | 1 | . | . | 0 | | | | | |
| 73 | 1 | . | 1 | . | 3 | | | | | |
| 74 | . | 1 | . | . | 0 | | | | | |
| 75 | 1 | . | 1 | . | 2 | | | | | |
| 76 | 1 | . | 1 | . | 1 | | | | | |
| 77 | . | 1 | . | . | 0 | | | | | |
| 78 | . | 1 | . | . | 0 | | | | | |
| 79 | 1 | . | 1 | . | 0 | | | | | |
| 7A | 1 | . | . | . | 35 | | | | | |
| 7B | . | 1 | . | . | 0 | | | | | |
| 7C | 1 | . | . | . | 34 | | | | | |
| 7D | . | 1 | . | . | 0 | | | | | |
| 7E | . | 1 | . | . | 0 | | | | | |
| 7F | 1 | 1 | . | . | 0 | | | | | | notes:
[1] No Error
[2] Check bit error - Bit 7 of ECC code bad
[3] Multi-bit error
[4] Address error
[5] Multi-bit error (overrides SBE flag)
[6] Single-bit error. bit 5 of CS is bad The primary purpose of the data path ICs is to provide a means to channel data in the appropriate directions for each memory operation. The data path ICs acquire data and cache status, calculate ECC bits for both data and cache status, perform error correction and detection functions, and route data and cache status from the main memory to the requesting processor. Control information necessary for operation of the data path ICs 60a-c is generated by circuitry external to the data path ICs.

Figure 8A:
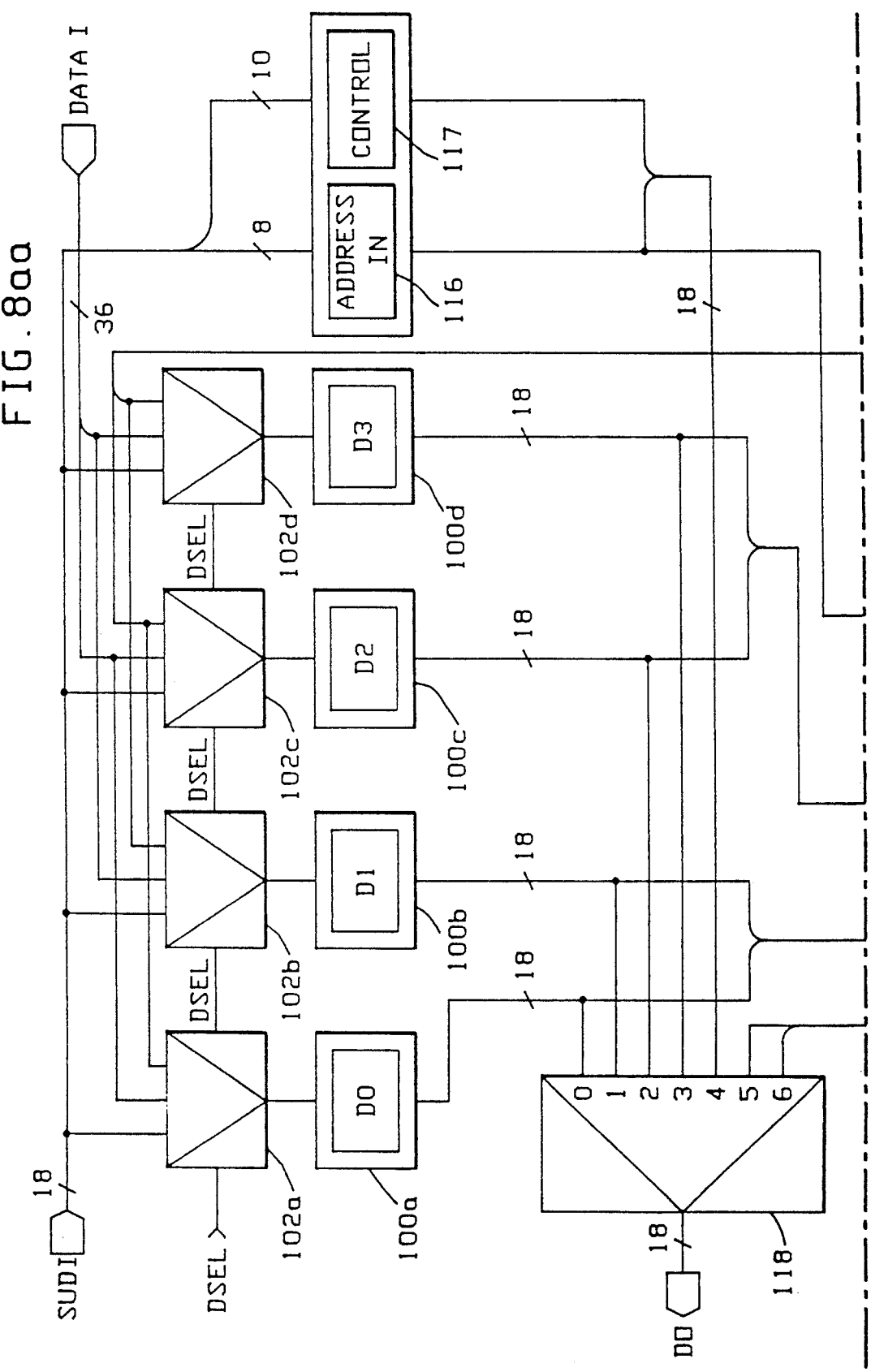
FIG. 8a is a simplified block diagram of the data section of a data path Integrated Circuit (IC), showing the major data flow paths and data ECC.
Figure 8B:
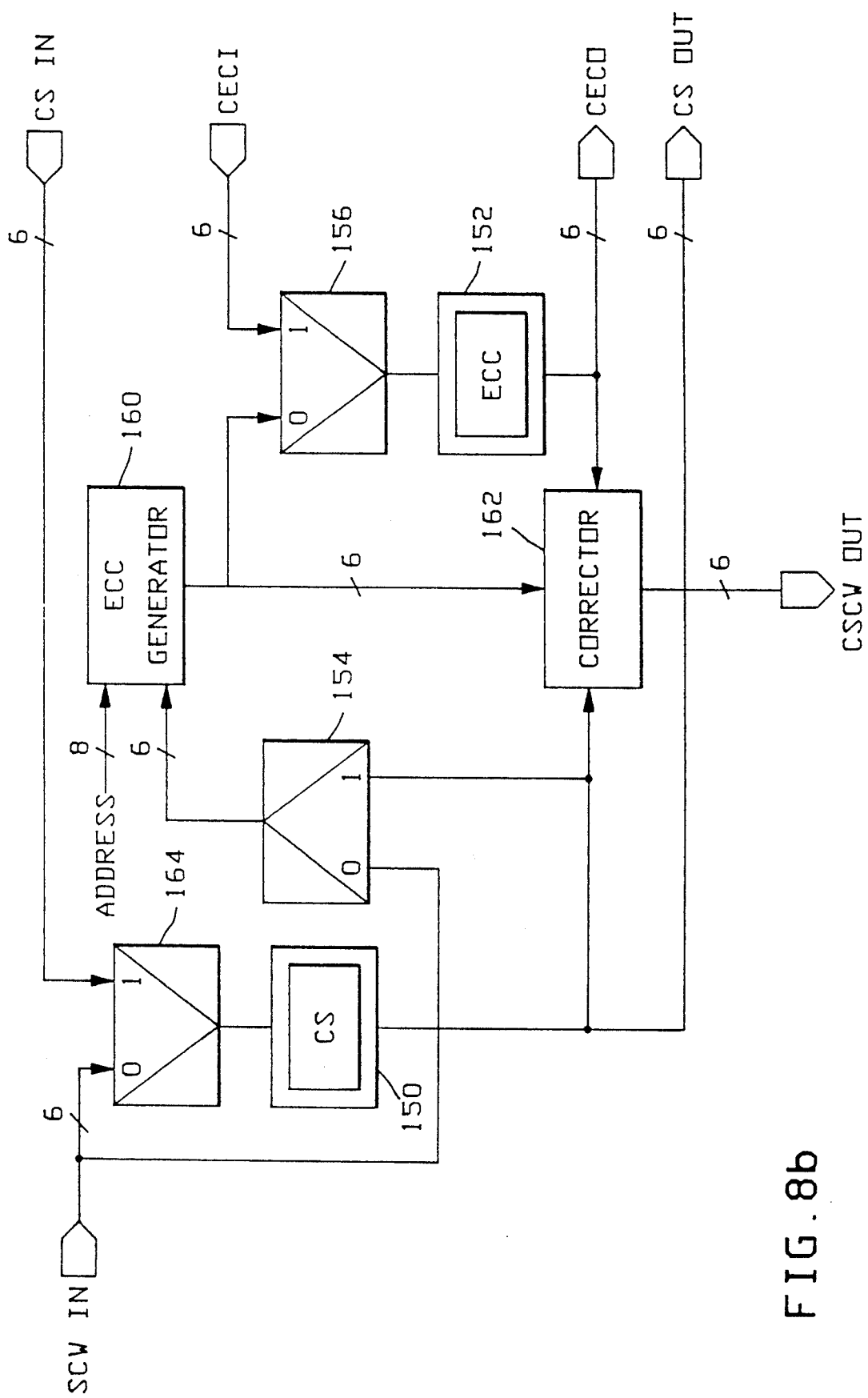
FIG. 8b a simplified block diagram of the cache status section of a data path IC, showing the major data flow paths of the cache status word and cache status ECC.

The internal structure of each of the data path ICs 60a-c is identical. FIGS. 8a and 8b show the major data flow paths through the data path IC 60a. FIG. 8a represents that portion of the data path IC which handles the data words 10a-d and part of the address value while FIG. 8b represents that portion of the IC which handles the cache status and the remainder of the address value.

In FIG. 8a, data registers 100a through 100d are used to hold one zone each of the system data words 10a-d during memory operations. Each data register 100a through 100d contains 18 bit positions. The data registers 100a-d obtain data values from the respective multiplexers 102a-d. These multiplexers 102a-d select data from one of the following sources:

1. SUDI: Data from the processor requesting memory access
2. DATAI: Input data from the main memory DIMMs 18
3. corrected data: from internal ECC circuitry 108.

The data registers 100a-d supply data bits to a Multiplexer 118. This multiplexer selects 18 bits of data provided by one of the four data registers 102a through 102d and applies it to external processors via the signal lines SUDO. The data registers 100a-d are also coupled to provide data to an ECC Generator 106 and an ECC correction circuit 108 through a multiplexer 104. The output ports of the registers 100a and 100b are concatenated as are the output ports of the registers 100c and 100d. These concatenated output ports provide two 36-bit values to the multiplexer 104. These two 36-bit values are also applied to a multiplexer 114 which provides the data output signal, DATAO to the DIMMs 18 of the main memory 202.

An 8 bit address register 116 latches the current address from the SUDI input lines and retains it for use in ECC generation logic 106.

Data ECC from the DIMMs 18 is supplied to the data path IC 60a on the signal line DECI. A multiplexer 110 selects between corrected check bits and DECI check bits from the DIMMs. The Data ECC register 112 contains the check bits selected by multiplexer 110. The check bits in this register 112 are also supplied to the DIMMS via the signal line DECO.

In a typical memory store operation, the MAU 220 (shown in FIGURE 1) applies four words, each 54 bits long, and a 24 bit address to the MSU 202. The address is applied first, followed by WORD 0, WORD 1, WORD 2, and WORD 3, one at a time. Both address and data are applied to the data path ICs 60a-c along the signal line SUDI. Eight address bits are loaded into register 116, and the succeeding data bits are loaded, one 18 bit segment at a time, into data registers 100a through 100d. That is, WORD 0 is loaded into register 100a, WORD 1 to register 100b, WORD 2 to register 100c, and WORD 3 to register 100d. Since each of the three data path ICs 60 has loaded one third of the data and address words, now the entire four words and complete address are stored within the three data path ICs 60a-c, and computation of the ECC is now possible.

Once the respective portions of the data words have been loaded into the registers 100a through 100d, are concatenated and passed, through the multiplexer 104 to the ECC generator 106. First, the 36 bits from WORD0 and WORD 1 are passed to generator 106. The generator 106 combines the 36 data bits with the eight-bit address value from register 116 and generates a seven-bit ECC value as set forth above. This seven-bit ECC value is then loaded to Data ECC Register A 112 through multiplexer 110. Following this, generator 106 computes an ECC value for the 36 data bits representing portions of WORD 2 and WORD 3. This seven-bit ECC value is stored in Data ECC Register B 122 through multiplexer 120.

Data ECC Register A 112 and Data ECC Register B are coupled through multiplexer 124 to the output port DECO of the data path IC 60a. The 36-bit data value representing the concatenation of the contents of the registers 100a and 100b is also applied to the multiplexer 114, the output port of which is the output port DATAO of the data path IC 60a. The output ports DATAO and DECO provide 43 binary bits for storage in the DIMMs 18 as shown in FIG. 5.

While the portions of WORD0 and WORD1 are being processed by the data path IC 60a, corresponding portions of WORD2 and WORD3 are being loaded into the registers 100c and 100d. While the words WORD0 and WORD1 are being stored into the DIMMs 18 from the data path ICs 60a, 60b and 60c, the respective portions of WORD2 and WORD3, held by the registers 100c and 100d, are processed in the same manner. Thus, during an MSU store operation, first WORD 0 and WORD 1 data bits are output on DATAO, along with the appropriate ECC bits on DECO, and then WORD 2 and WORD 3 data bits are output on DATAO and the appropriate ECC bits on DECO.

The determination of whether the MSU store operation attempted by a particular processor is valid is made by reading cache status. The cache status ECC logic corrects single-bit errors and verifies that the right address location was read. The data ECC logic as described above is used to generate data ECC prior to executing a valid MSU store.

As set forth above, MSU fetch operations for this embodiment of the invention are performed as a read-modify-write cycle. When data is read from the DIMMs 18, 36 bits of data are provided to the input port DATAI and seven bits of ECC are provided to the input port DECI of each of the data path ICs 60a, 60b and 60c. The 36 data bits applied to the IC 60a are divided into two 18-bit portions which are loaded into the registers 100a and 100b through the respective multiplexers 102a and 102b. The seven-bit ECC value is loaded, through the multiplexer 110, into the Data ECC Register A 112.

The data values held by the registers 100a and 100b are applied to the ECC generator 106 and ECC corrector circuitry 108 as set forth above. The ECC corrector circuitry generates syndrome bits from the data provided by the multiplexer 104 and from the ECC provided by the Data ECC Register A 112 and corrects the data accordingly. This corrected data is loaded into the registers 100a and 100b. If the corrector 108 indicates that an error occurred in one of the check bits, then the correct ECC is provided to the Data ECC Registers A and B (112 and 122) by the ECC generator 106. Next, the data values held in the registers 100a and 100b are sequentially sent to the MAU 220 coupled to the requesting processor via the multiplexer 118 and output port SUDO. At the same time, these data values, and the seven-bit ECC value held by the Data ECC Register A 112, are written back into the DIMMs 18 as set forth above.

While the 43 bits of corrected data and ECC are being processed by the data path IC 60a, the next 43 bits of uncorrected data and their ECC may be loaded into the registers 100c, 100d and Data ECC Register B 122 for similar processing.

The control signals for the various multiplexers and registers of the data path ICs 60a, 60b and 60c are generated by control circuitry (not shown) which is responsive to a ten-bit control word provided by the requesting processor MAU 220 along with eight of the twenty four address bits. This value indicates, for example, the type of memory request (store or fetch). In response to this value, the control circuitry cycles the data path circuitry as set forth above. One skilled in the art of digital logic design could readily build suitable data path circuitry from the description set forth above.

FIG. 8b shows that section of the data path IC 60a which handles the flow of the cache status word and cache status check bits. The cache status register 150 stores either cache status bits obtained directly from the DIMMs on the input lines CSIn, or a new cache status word which is supplied on CSCWIN by external control logic. Multiplexer 154 selects either the previous cache status word from the DIMMs (available at the output of the cache status register 150) or a new cache status word supplied externally on CSCWIN. The resulting word is applied to the ECC generator 160. Likewise, 8 address bits are supplied to the ECC generator 160 to be included in the ECC domain. The cache status register 150 also supplies cache status bits to the DIMMs on signal lines CSOUT.

Cache status check bits from the DIMMs are supplied via the signal line CECI. These bits are multiplexed with the check bits generated by the ECC generator 160 by a multiplexer 156. The selected check bits are stored in ECC register 152. Cache status check bits are supplied to the DIMMs on signal lines CECO. Single bit error correction takes place in the error correction circuit 162. Corrected cache status bits are then supplied to external control on the output line CSCWOUT.

A summary of the operation of cache status portion of the data path IC 60a is now given. A read-modify-write cycle is followed, in a similar fashion to the data portion described above. A read operation from the DIMMs 18 occurs, which brings cache status to the input line CSIn and the corresponding ECC to the input line CECI. This cache status is stored in CS register 150, and ECC is stored in register 152. The contents of these two registers are then supplied to the corrector circuit 162, which sends corrected cache status to the MSU on output signal line CSCWOUT. External control circuitry, not discussed here, updates the cache status. The new cache status is supplied on input line CSCWIN and is loaded into cache status register 150. At the same time, CSCWIN is applied to the ECC generator 160 and the new ECC is loaded into ECC register 152 Then, the contents of register 150 and 152 are written to the DIMMs 18 on signal lines CSOUT and CECO, respectively.

It is understood by one skilled in the art that many variations of the embodiment described herein are contemplated. These include different word sizes, different numbers of check bits, different numbers of zones per word and different numbers of zones per error domain. While the invention has been described in terms of an exemplary embodiment, it is contemplated that it may be practiced as outlined above with modifications within the spirit and scope of the appended claims.

The invention claimed is:

1. A method of storing and retrieving data words in memory devices wherein error correction bits are encoded into the data words during storage or decoded from the data words during retrieval, the method comprising the steps of:

a) dividing data words into domains;

b) adding error correction b its to each domain, sufficient in number to detect and correct at least one-bit errors in that domain;

c) dividing each domain into a plurality of component parts;

d) storing each component part within a domain in a respectively different physical memory device;

d) retrieving the domains from said memory devices;

f) processing the error correction bits in each retrieved domain and computing a syndrome for each domain;

g) determining locations for any bit errors within each retrieved domain responsive to the syndrome;

h) correcting any erroneous bits in each retrieved domain; and i) reassembling the retrieved domains into words.

2. The method of claim 1 wherein the step of dividing each domain into a plurality of component parts comprises the steps of dividing each domain into individual bits.

3. The method of claim 1 in which the step of dividing the data words into domains further comprises the step of appending address bits to each domain.

4. The method of claim 1 in which the step of dividing words into domains further comprises the steps of:

a) dividing each word into multiple zones; and b) combining one zone from each of at least two words to form one of said domains.

5. The method of claim 1 in which the step of adding error correction bits to each domain is performed simultaneously for multiple domains.

6. The method of claim 1 in which the step of processing the error correction bits in each retrieved domain and computing a syndrome for each retrieved domain is performed simultaneously for multiple domains.

7. A method of transferring data words among a cache memory and a plurality of memory devices wherein error correction bits are encoded into the data words during storage or decoded from the data words during retrieval, the method comprising the steps of:

a) dividing data words into domains;

b) adding error correction bits to each domain, sufficient in number to detect and correct at least one-bit errors in that domain;

c) appending cache status bits and cache status error correction bits to each domain;

d) storing each domain in said plurality of memory devices;

e) retrieving the domains from said memory devices;

f) processing the error correction bits in each retrieved domain and computing a syndrome for each domain;

g) determining locations for any bit errors within each retrieved domain responsive to the syndrome;

h) correcting any erroneous bits in each retrieved domain;

i) reassembling the retrieved domains into words j) processing the cache status error correction bits upon retrieval from memory; and k) correcting any erroneous bits in the retrieved cache status as indicated by the error correction bits for the retrieved domains that include the cache status bits.

8. A method for storing data in volatile memory devices and retrieving data from said memory devices wherein error correction bits are encoded with the data during storage and decoded during retrieval, comprising the steps of:

a) dividing the data words into data segments;
b) performing error correction encoding on each data segment;
c) dividing each data segment into a plurality of component parts;
d) storing each component part of each segment in a respectively different volatile memory device;
e) retrieving the plurality of component parts from the respective volatile memory devices for each data segment;
f) performing decode processing on each of said retrieved data segments and computing a syndrome value for each retrieved data segment, respectively;
g) changing data bit values in said retrieved data segments in response to the respective syndrome value indicating an error condition; and
h) reassembling said retrieved data segments into data words.

9. A system for storing data in a plurality of volatile memory storage elements and retrieving data from said memory storage elements wherein error correction bits are encoded with the data during storage and decoded during retrieval, comprising:
means for dividing the data words into data segments;
error correction encoding means for generating an error correction code value for each data segment;
means for dividing each data segment into a plurality of component parts;
means for storing each component part within a segment in a respectively different volatile memory storage element;
means for retrieving the plurality of component parts from the respective volatile memory devices for each data segment;
error detection means for generating syndrome values for each of said retrieved data segments;
error correction means for changing data bit values in said retrieved data segments in response to the respective syndrome value indicating an error condition; and
means for assembling said retrieved data segments into data words.

10. The system set forth in claim 9 wherein the component parts of each domain are respectively different bits, each bit of a storage element thus being part of a respectively different data segment and covered by a respectively different ECC domain, thus providing multiple-bit error correction in the event of a total storage element failure.

11. The system set forth in claim 10 wherein each of said memory storage elements includes an address input port to which an address value is applied to identify data storage locations within said memory storage elements into which respective bits of said data segment are to be stored, said system further including:
means, coupled to said dividing means, for concatenating at least a portion of said address value to said data segment;
means, coupled to said error correction encoding means for generating an error correction code from the concatenated data segment and address value.

* * * * *